United States Patent
Kim

(10) Patent No.: US 9,226,063 B2
(45) Date of Patent: Dec. 29, 2015

(54) METHOD AND APPARATUS FOR RECOGNIZING ACCESSORY OF PORTABLE TERMINAL

(75) Inventor: Tae Seon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 901 days.

(21) Appl. No.: 13/218,019

(22) Filed: Aug. 25, 2011

(65) Prior Publication Data
US 2012/0051562 A1   Mar. 1, 2012

(30) Foreign Application Priority Data

Aug. 26, 2010 (KR) .................. 10-2010-0082887

(51) Int. Cl.
| | |
|---|---|
| H04R 3/00 | (2006.01) |
| H04M 1/725 | (2006.01) |
| H04R 1/10 | (2006.01) |
| H04M 1/02 | (2006.01) |
| H04M 1/60 | (2006.01) |

(52) U.S. Cl.
CPC ............. *H04R 3/00* (2013.01); *H04M 1/72527* (2013.01); *H04R 1/1041* (2013.01); *H04M 1/0274* (2013.01); *H04M 1/6058* (2013.01)

(58) Field of Classification Search
USPC .......... 381/107, 71.4, 71.7, 71.8, 71.11, 71.1, 381/74, 79, 81, 93, 91, 92, 94.1, 94.5, 94.7, 381/95, 102–104; 439/222, 396; 455/556.1, 455/575.2, 557, 550.1
See application file for complete search history.

(56) References Cited

U.S. PATENT DOCUMENTS

| | | | | |
|---|---|---|---|---|
| 6,069,960 | A * | 5/2000 | Mizukami et al. | 381/74 |
| 6,161,027 | A * | 12/2000 | Poirel | 455/572 |
| 7,836,216 | B2 * | 11/2010 | Kashi et al. | 710/15 |
| 7,909,651 | B2 * | 3/2011 | Kim et al. | 439/638 |
| 8,041,047 | B2 * | 10/2011 | Matsumoto et al. | 381/71.1 |
| 8,229,513 | B2 * | 7/2012 | Ibe | 455/569.1 |
| 2004/0080440 | A1 * | 4/2004 | Su et al. | 341/141 |
| 2006/0258400 | A1 * | 11/2006 | Lee | 455/557 |
| 2008/0318629 | A1 * | 12/2008 | Inha et al. | 455/557 |
| 2009/0136058 | A1 * | 5/2009 | Choi et al. | 381/74 |
| 2009/0227298 | A1 * | 9/2009 | Fukunaga | 455/569.1 |
| 2009/0291598 | A1 * | 11/2009 | Cheng et al. | 439/668 |
| 2010/0014701 | A1 * | 1/2010 | Li | 381/384 |
| 2011/0103608 | A1 * | 5/2011 | Wu et al. | 381/74 |

\* cited by examiner

*Primary Examiner* — Davetta W Goins
*Assistant Examiner* — Kuassi Ganmavo
(74) *Attorney, Agent, or Firm* — Jefferson IP Law, LLP

(57) ABSTRACT

A method and an apparatus for recognizing an accessory of a portable terminal are provided. The apparatus includes an interface unit in which the accessory is mounted, a power supply for supplying microphone bias power for recognizing the accessory in the interface unit, a current detector for determining an output current of the power supply, and a controller for determining whether the output current of the power supply exceeds a preset reference current when mounting of the accessory is sensed, and for recognizing a type of the accessory according to the output current of the power supply when the output current of the power supply exceeds the preset reference current. The apparatus may automatically recognize a type of an accessory connected with an interface unit to improve the convenience for a user.

15 Claims, 3 Drawing Sheets

METHOD AND APPARATUS FOR RECOGNIZING ACCESSORY OF PORTABLE TERMINAL

PRIORITY

This application claims the benefit under 35 U.S.C. §119 (a) of a Korean patent application filed on Aug. 26, 2010 in the Korean Intellectual Property Office and assigned Serial No. 10-2010-0082887, the entire disclosure of which is hereby incorporated by reference.

BACKGROUND OF THE INVENTION

1. Field of the Invention

The present invention relates to a method and an apparatus for recognizing an accessory of a portable terminal. More particularly, the present invention relates to an apparatus and a method for automatically recognizing a type of an accessory mounted in an interface unit using current detection and voltage detection.

2. Description of the Related Art

In recent years, with significant advances and development of information, communication, and semiconductor technologies, the use of portable terminals has rapidly increased. More particularly, recent portable terminals incorporate mobile convergence advances in which the portable terminal provides additional functions as well as the traditional functions such as placing a call. A representative mobile communication terminal provides various functions including a TV watching function (e.g., mobile broadcast such as Digital Multimedia Broadcasting (DMB)) or Digital Video Broadcasting (DVB), a music play function (e.g., MPEG Audio Layer-3 (MP3)), a photographing function, and an Internet access function as well as general communication functions such as voice call, and message transmission and reception.

The portable terminal provides an interface unit in which an accessory is mounted. The accessory may be a 3 pole earphone, a 4 pole earphone, a TV-OUT cable, and a text telephone (TTY) cable connecting with a device providing a TTY service. In recent years, to support a miniaturization trend of portable terminals, the number of portable terminals using a 3.5 mm connector with four terminals as the interface unit has been increased. Typically, when mounting of the accessory is detected, the conventional portable terminal with the 3.5 mm connector displays a pop-up menu displaying a type of the accessory, and allows a user to select the type of the mounted accessory from the pop-up menu. However, the method for recognizing the mounted accessory using the pop-up menu is inconvenient because the user must select a type of the accessory each time the accessory is mounted. Therefore, there is a need for an improved apparatus and method for recognizing an accessory of a portable terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for automatically recognizing an accessory mounted in an interface unit.

Another aspect of the present invention is to provide an apparatus and a method for recognizing an accessory of a portable terminal capable of automatically recognizing a type of an accessory mounted in an interface unit using current detection and voltage detection without errors.

In accordance with an aspect of the present invention, an apparatus for recognizing an accessory of a portable terminal is provided. The apparatus includes an interface unit in which the accessory is mounted, a power supply for supplying microphone bias power for recognizing the accessory in the interface unit, a current detector for determining an output current of the power supply, and a controller for determining whether the output current of the power supply exceeds a preset reference current when mounting of the accessory is sensed, and for recognizing a type of the accessory according to the output current of the power supply when the output current of the power supply exceeds the preset reference current.

In accordance with another aspect of the present invention, a method for recognizing an accessory of a portable terminal is provided. The method includes detecting an output current of a power supply supplying microphone bias power for recognizing the accessory when connection of the accessory is sensed, comparing the output current of the power supply with a preset reference current, and recognizing a type of an accessory corresponding to the output current of the power supply when the detected output current of the power supply exceeds the reference current.

As illustrated above, a method and an apparatus for recognizing an accessory of a portable terminal according to exemplary embodiments of the present invention may automatically recognize various accessories without errors by recognizing the accessory corresponding to an output current of a power supply supplying power for recognizing a type of the accessory when the output current exceeds a preset reference current, and by recognizing the accessory through voltage detection when the output current of a power supply does not exceed a preset reference current. Therefore, exemplary embodiments of the present invention may automatically recognize a type of a mounted accessory to improve the convenience for a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a portable terminal includes an interface unit in which an accessory is mounted. The portable terminal may be a mobile communication terminal, a smart phone, a Tablet Personal Computer (PC), a Portable Multimedia Player (PMP), a Navigation terminal, a Personal Digital Assistant (PDA), and the like.

Hereinafter, a mobile communication terminal is described by way of example.

Figure 1:
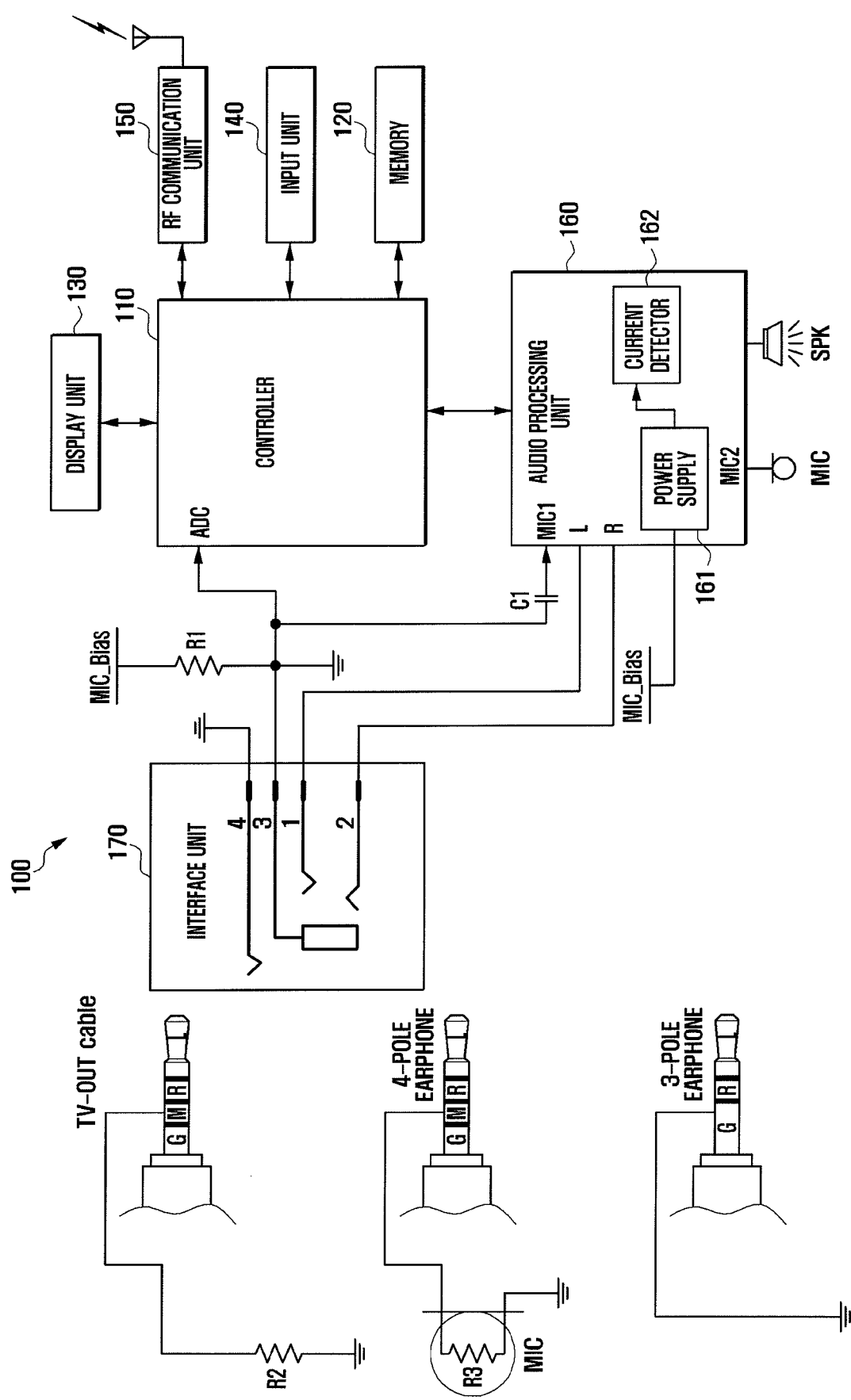
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, a portable terminal 100 may include a controller 110, a memory 120, a display unit 130, an input unit 140, a Radio Frequency (RF) communication unit 150, an audio processing unit 160, and an interface unit 170. The audio processing unit 160 may include a power supply 161 and a current detector 162.

The RF communication unit 150 may form a first communication channel for a call and a second communication channel for transmitting data. That is, the RF communication unit 150 may form a speech call channel, a data communication channel, and an image call channel with a base station. The RF communication unit 150 may transmit a speech signal and an image signal to another terminal through the speech call channel and the image call channel under the control of the controller 110 or receive the speech signal and the image signal from the other terminal. The RF communication unit 150 may include a transmitter (not shown) for up-converting a frequency of a transmitted signal and for amplifying the signal, a receiver (not shown) for low-noise-amplifying a received signal and for down-converting the signal, and a transmitting and receiving separator for separating a received signal and a transmitting signal.

The input unit 140 transfers a first input signal for inputting various numerals and character information and a second input signal associated with setting and controlling various functions of the portable terminal 100 to the controller 110. That is, the input unit 140 may include input keys for inputting numerals and character information and function keys for setting or controlling respective functions of the portable terminal 100. The function keys may include arrow keys, side keys, and hot keys set to execute a certain function. The input unit 140 may be configured by any one a touch pad, a touch screen, a key pad of a general key arrangement, a QWERTY type key pad, and a combination thereof according to a provision form of the portable terminal 100.

The display unit 130 displays information input by a user or information provided to the user as well as various menus of the portable terminal 100. For example, the display unit 130 may provide various screens, such as an idle screen, a menu screen, a message making screen, and an image call screen according to utilization of the portable terminal 100. More particularly, the display unit 130 may display an image (e.g., an icon) indicating a type of a recognized accessory on one side of a screen. The display unit 130 may be configured by a Liquid Crystal Display (LCD), an Organic Light Emitted Diode (OLED), or an Active Matrix Organic Light Emitted Diode (AMOLED). When the display unit 130 is provided in a touch screen type, it may act as the input unit 140.

Various accessories may be mounted in the interface unit 170. The accessory may be a TV-OUT cable, a 4-pole earphone, a 3-pole earphone, or a text telephone (TTY) cable. The interface unit 170 may be a 3.5 mm connector with four terminals as shown in FIG. 1. For example, the interface unit 170 may include a first terminal connecting with a left sound terminal L of the audio processing unit 160 and outputting a left sound signal, a second terminal connecting with a right sound terminal R of the audio processing unit 160 and outputting a right sound signal, a third terminal receiving a microphone signal, and a fourth terminal being a ground terminal In this case, a capacitor C1 may be serially connected between the third terminal of the interface unit 170 and a microphone terminal MIC 1 of the audio processing unit 160. The capacitor C1 may execute a function of cutting-off a DC current. In the meantime, a resistor or an inductor may be located between the third terminal of the interface unit 170 and the microphone terminal MIC 1 of the audio processing unit 160 according to a designer's intention. A suitable combination of the capacitor, the resistor, or the inductor may be located between the third terminal of the interface unit 170 and the microphone terminal MIC 1 of the audio processing unit 160. Referring to FIG. 1, a connection relationship of the first terminal to the fourth terminal has been described when a stereo type 4-pole earphone is connected by way of example. That is, the connection relationship of respective terminals (first terminal to fourth terminal) may change according to a type of a connected accessory. To do this, the portable terminal 100 may include a switch for switching a connection path between terminals of the interface unit 170 under the control of the controller 110 according to a type of the mounted accessory.

The third terminal may receive power from the power supply 161 and supply bias power for recognizing a type of an accessory connected with the interface unit 170. When the accessory includes a microphone, the bias power may be supplied to the microphone. A resistor R1 (referred to as 'bias resistor' hereinafter) may be serially connected between the power supply 161 and the third terminal. Further, the third terminal may connect with an Analog-Digital Conversion (ADC) terminal of the controller 110 for recognizing a type of an accessory through voltage detection. A more detailed description thereof will be described below.

The audio processing unit 160 connects with a microphone MIC and a speaker (SPK). The audio processing unit 160 converts a voice signal input from the microphone (MIC) into data, and transmits the data to the controller 110. The audio processing unit 160 converts a voice signal input from the controller 110 into an analog signal and outputs the analog signal through the speaker. Further, the audio processing unit 160 may output various audio signals (e.g., MP3 files, audio signals according to playback of moving images) created from the portable terminal 100 through the speaker. The microphone and the speaker may be a microphone and a speaker included in the portable terminal 100 or a microphone and a speaker included in an accessory (e.g., 4-pole earphone), respectively. More particularly, the audio processing unit 160 may include a power supply 161 and a current detector 162.

The power supply 161 may supply bias power MIC_Bias to a microphone of an accessory. The microphone bias power MIC_Bias may be used to recognize a type of the accessory. In more detail, if the accessory is mounted in the interface unit 170, the microphone bias power MIC_Bias is divided by impedance (R2 upon connection of a TV-OUT cable or R3 upon connection of a 4-pole earphone) of the accessory and bias resistance R1, and the divided microphone bias power may be input to the ADC terminal of the controller 110. At this time, the impedance may change, according to accessories, which results in a change in a voltage input to the ADC terminal of the controller 110. In this case, the controller 110 may determine a voltage input to the ADC terminal thereof to recognize a type of the accessory. To do this, the memory 120 may store an accessory recognition table.

The current detector 162 may detect an output current of the power supply 161. In more detail, when the accessory is mounted in the interface unit 170, the current detector 162 may determine and report an output current of the power supply 161 to the controller 110. Meanwhile, the current detector 162 may determine whether the output current of the power supply 161 exceeds a reference current and transmit the determination result to the controller 110.

The memory 120 may store an Operating System (OS) of the mobile terminal 100, other option functions, for example, an application program necessary for a sound playing function, and an image or moving image playing function, user data, and data to be transmitted and received. More particularly, the memory 120 may store an accessory recognition table for recognizing a type of an accessory mounted in the interface unit 170 as listed in the following Table 1.

TABLE 1

| MIC_Bias: 2.6 V | ADC voltage |
|---|---|
| TV-OUT table | 0.09 V |
| 4-pole earphone | 2.1 V |
| 3-pole earphone | 0 V |
| TTY cable | 1.3 V |

Referring to FIG. 1, a voltage input to the ADC terminal of the controller 110 may change according to a type of an accessory mounted in the interface unit 170. For example, as listed in Table 1, when a 4-pole earphone is connected in a state that the microphone bias power MIC_Bias is 2.6 V and bias resistance R1 is 2.1 kΩ, a voltage of 2.1 V is input to the ADC terminal of the controller 110. When the TV-OUT cable is connected, a voltage of 0.09 V may be input to the ADC terminal of the controller 110. When a TTY cable is connected, a voltage of 1.3 V may be input to the ADC terminal of the controller 110. When a 3-pole earphone is connected, a voltage of 0V may be input to the ADC terminal of the controller 110. Upon connection of both the TV-OUT cable and the 3-pole earphone, a difference of voltages input to the ADC terminal of the controller 110 is not sufficient to distinguish between accessories. To address this issue, increasing the amplitude of the microphone bias power MIC_Bias may increase a voltage difference between the accessories. However, as the microphone bias power MIC_Bias is increased, a sleep current in a connected state of the accessories may also be increased. Accordingly, in general, the microphone bias power MIC_Bias is set to 2~3V.

It is to be understood that Table 1 is an example and that the present invention is not limited thereto. Further, Table 1 has illustrated that the accessory recognition table stores analog voltages. However, the accessory recognition table may store codes of 12 bits obtained by converting an analog voltage into a digital value.

The memory 120 may store a reference current for distinguishing a TV-OUT cable from a 3-pole earphone according to an output current of the power supply 161. The following Table 2 is experimental data measuring an output current of the power supply 161 upon connection of a 3-pole earphone and upon connection of a TV-OUT cable in a state shown in FIG. 1 to set the reference current.

TABLE 2

| | | | Output current of power supply | | |
|---|---|---|---|---|---|
| Bias voltage(V) | Bias resistance (kΩ) | Z1 (kΩ) | 3-pole earphone (mA) | TV-OUT cable (mA) | Current |
| 2.6 | 2.18 | 1 | 1.192 | 1.155 | 0.037 |
| 2.8 | 2.18 | 1 | 1.284 | 1.244 | 0.040 |
| 3.0 | 2.18 | 1 | 1.376 | 1.333 | 0.043 |
| 3.3 | 2.18 | 1 | 1.513 | 1.466 | 0.047 |
| 2.6 | 2.18 | 5 | 1.192 | 1.153 | 0.039 |
| 2.8 | 2.18 | 5 | 1.284 | 1.242 | 0.042 |
| 3.0 | 2.18 | 5 | 1.376 | 1.331 | 0.045 |
| 3.3 | 2.18 | 5 | 1.513 | 1.464 | 0.049 |
| 2.6 | 2.18 | 10 | 1.192 | 1.153 | 0.039 |
| 2.8 | 2.18 | 10 | 1.284 | 1.241 | 0.043 |
| 3.0 | 2.18 | 10 | 1.376 | 1.330 | 0.046 |
| 3.3 | 2.18 | 10 | 1.513 | 1.463 | 0.050 |
| 2.6 | 2.18 | 20 | 1.192 | 1.153 | 0.039 |
| 2.8 | 2.18 | 20 | 1.284 | 1.241 | 0.043 |
| 3.0 | 2.18 | 20 | 1.376 | 1.330 | 0.046 |
| 3.3 | 2.18 | 20 | 1.513 | 1.463 | 0.050 |

Referring to Table 2, it will be appreciated that an output current of the power supply 161 upon connection of the 3-pole earphone and an output current of the power supply 161 upon connection of the TV-OUT cable have a current difference of 37~50 mA according to the bias voltage. The controller 110 may recognize a type of an accessory connected to the interface unit 170 based on the current difference. At this time, the reference current may be set as an intermediate value between the output current of the power supply 161 upon connection of the 3-pole earphone and the output current of the power supply 161 upon connection of the TV-OUT cable. For example, when the bias voltage is 2.6V and Z1 is 1 kΩ, the reference current may be set to 1.173 mA. When the bias voltage is 3.3V and Z1 is 1 kΩ, the reference current may be set to 1.489 mA. The reference current is one example. However, the present invention is not limited thereto.

It is assumed that Z1 is the impedance of a microphone terminal MIC of the audio processing unit 160 and the ADC terminal of the controller 110 which differs according to manufacturing companies of a chip. It may be seen from the measured result of Table 2 that the present invention is not restrictively applied to a chip of a certain manufacturing company.

The controller 110 may control an overall operation of the mobile terminal 100 and signal flows between internal blocks of the mobile terminal 100. More particularly, the controller 110 may sense a case where an accessory is mounted in the interface unit 170. To do this, the controller 110 may include an accessory connection sensing terminal (not shown). The accessory connection sensing terminal may be an interrupt terminal operating in an active low type or an active high type. A method for sensing connection of a peripheral device through the interrupt terminal is apparent to a person having ordinary skill in the art to which the present invention pertains, and thus a detailed description thereof is appropriately omitted.

If the connection of the accessory is sensed, the controller 110 may determine whether an output current of the power supply 161 exceeds the preset reference current. In more detail, if the connection of the accessory is sensed, the controller 110 may transmit a command requesting determining of an output current of the power supply 161 to the audio processing unit 160. If the current detector 162 of the audio processor 160 receives the command, it may determine an output current of the power supply 161, and transmit the determined output current thereof to the controller 110. If the controller 110 receives an output current of the power supply 161, it may determine whether the output current of the power supply 161 exceeds the reference current. When the output current of the power supply 161 exceeds the reference current, the controller 110 may recognize a type of an accessory corresponding to the output current of the power supply 161. For example, when the output current of the power supply 161 exceeds the reference current, the controller 110 may recognize that a 3-pole earphone is mounted in the interface unit 170. Conversely, when the output current of the power supply 161 does not exceed the reference current, the controller 110 may recognize a type of an accessory connected to the interface unit 170 based on a voltage input to the ADC terminal. In more detail, the controller 110 may convert an analog voltage input to the ADC terminal into a digital code, and search an accessory recognition table stored in the memory 129 to automatically recognize that an accessory corresponding to the converted digital code is connected to the interface unit 170. If recognition of the accessory mounted in the interface unit 170 is terminated, the controller may output an image (e.g., an icon) corresponding to a type of the recognized accessory on one side of the display unit 130.

Although not shown in FIG. 1, the portable terminal 100 may further include structural elements having additional functions such as a camera module for photographing images or moving images, a near distance communication module for near distance wireless communication, a broadcast receiving module for receiving broadcast, a digital sound source module like an MP3 module, and an Internet communication module for executing Internet functions. Since the structural elements can be variously changed according to a convergence trend of a digital device, no elements are listed. However, the portable terminal 100 may include structural elements equivalent to the foregoing structural elements.

Figure 2:
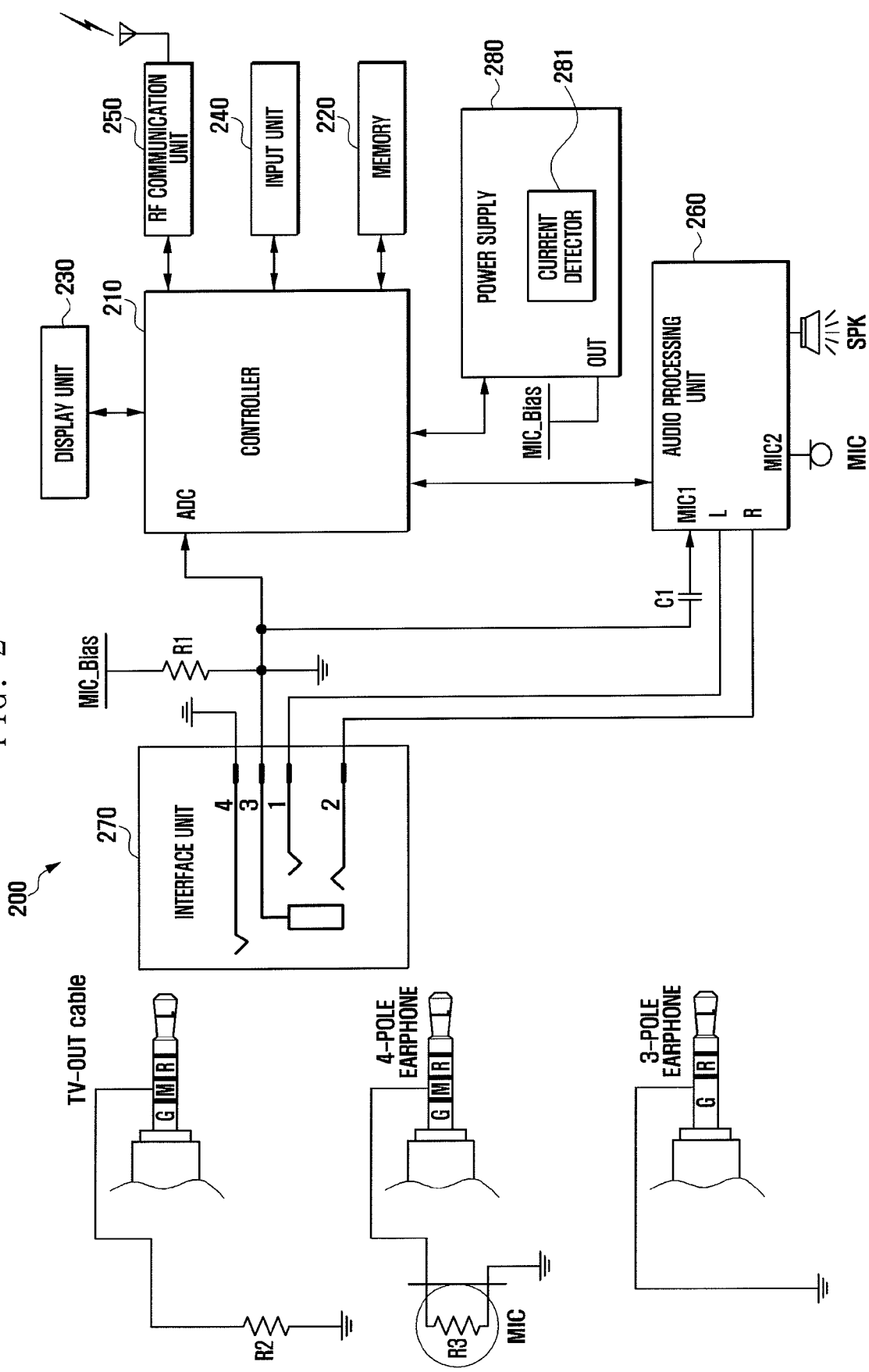
FIG. 2 is a block diagram illustrating a configuration of a portable terminal according to an exemplary embodiment of the present invention.

FIG. 2 is a block diagram illustrating a configuration of a portable terminal according to an exemplary embodiment of the present invention.

Referring to FIG. 2, the portable terminal 200 may include a controller 210, a memory 220, a display unit 230, an input unit 240, an RF communication unit 250, an audio processing unit 260, an interface unit 270, and a power supply unit 280. The power supply unit 280 may include a current detector 281. That is, the portable terminal 200 has a structure substantially identical to that of the portable terminal 100 of FIG. 1. However, the audio processing unit 260 of the portable terminal 200 does not include the power supply 161 and the current detector 162 unlike the audio processing unit 160 of FIG. 1. The difference is that the portable terminal 200 separately includes a power supply unit 280 with the current detector 281. Here, the portable terminal 200 has substantially the same construction as that of the portable terminal 100 shown in FIG. 1 described above, and thus a detailed description thereof is appropriately omitted.

Figure 3:
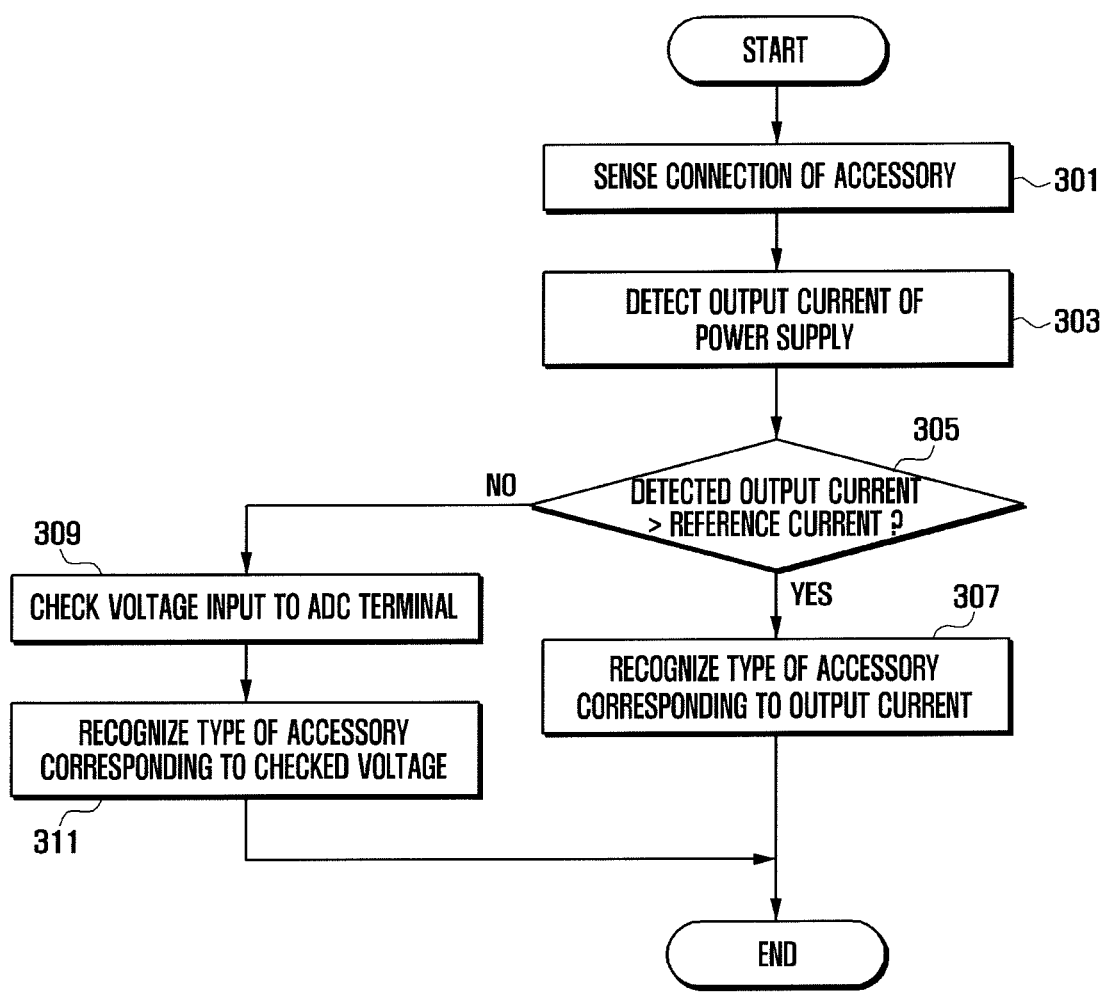
FIG. 3 is a flowchart illustrating a method for recognizing an accessory of a portable terminal according to an exemplary embodiment of the present invention.

FIG. 3 is a flowchart illustrating a method for recognizing an accessory of a portable terminal according to an exemplary embodiment of the present invention. Hereinafter, the portable terminal 100 having a construction as illustrated in FIG. 1 is described by way of example.

Referring to FIG. 1 and FIG. 3, the controller 110 may sense connection of an accessory in step 301.

To do this, the controller 110 may include an accessory connection sensing terminal (not shown). The accessory connection sensing terminal may be an interrupt terminal operating in an active low type or an active high type. If the connection of the accessory is sensed, the controller 110 may detect an output current of the power supply 161 in step 303. In more detail, if the connection of the accessory is sensed, the controller 110 may transmit a command requesting determining of an output current of the power supply 161 to the audio processing unit 160. If the current detector 162 of the audio processor 160 receives the command, it may measure an output current of the power supply 161, and transmit the measured output current thereof to the controller 110.

If the controller 110 receives an output current of the power supply 161, it may determine whether the output current of the power supply 161 exceeds the reference current in step 305. When the output current of the power supply 161 exceeds the reference current, the controller 110 may recognize a type of an accessory corresponding to the output current of the power supply 161 in step 307. For example, when the output current of the power supply 161 exceeds the reference current, the controller 110 may recognize that a 3-pole earphone is mounted in the interface unit 170. Conversely, when it is determined in step 305 that the output current of the power supply 161 does not exceed the reference current, the controller 110 may determine a voltage input to an ADC terminal in step 309. The voltage input to the ADC terminal is a voltage obtained by dividing a micro bias power MIC_Bias by bias a resistance R1 and an impedance of an accessory connected to the interface unit 170 (e.g., R2 upon connection of TV-OUT cable or R3 upon connection of 4-pole earphone).

The controller 110 may search an accessory recognition table stored in the memory 120 to automatically recognize a type of an accessory corresponding to the determined voltage in step 311. For example, as listed in Table 1, when a voltage of 2.1V is input, the controller 110 may recognize that a 4-pole earphone is connected to the interface unit 170. When a voltage of 1.3V is input, the controller 110 may recognize that a TTY cable is connected to the interface unit 170. When a voltage of 0.09V is input, the controller 110 may recognize that a TV-OUT cable is connected to the interface unit 170. Meanwhile, although not shown in FIG. 3, if recognition of an accessory connected to the interface unit 170 is terminated through the current detection or the voltage detection, the controller 110 may output an image (e.g., an icon) corresponding to the recognized accessory on the display unit 130.

The foregoing exemplary embodiment has illustrated that the controller 110 receives and compares an output current of the power supply 161 with the reference current. The present invention is not limited thereto. That is, in another exemplary embodiment of the present invention, when connection of an accessory is sensed, the current detector 162 may measure and compare an output current of the power supply 161 with a reference current, and transmit the comparison result to the controller 110.

As illustrated previously, when an output current of a power supply that is supplying power for recognizing a type of an accessory exceeds a reference current, the present invention recognizes an accessory corresponding to the output current. When the output current of the power supply does not exceed the reference current, the present invention may recognize an accessory through voltage detection to automatically recognize various accessories without errors. As illustrated previously, exemplary embodiments of the present invention may automatically recognize a mounted accessory to improve the convenience for a user.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. An apparatus for recognizing an accessory of a portable terminal, the apparatus comprising:
    an interface unit in which the accessory is mounted, and including a microphone line;
    a power supply configured to supply a microphone bias power for recognizing the accessory in the interface unit;
    a current detector configured to determine an output current of the power supply; and
    a controller including an analog-digital conversion terminal, and configured to determine whether the output current of the power supply exceeds a preset reference current when mounting of the accessory is sensed, to recognize a type of the accessory according to the output current of the power supply when the output current of the power supply exceeds the preset reference current, and to recognize a type of the accessory according to a voltage input to the analog-digital conversion terminal when the output current of the power supply does not exceed the preset reference current,
    wherein the voltage input to the analog-digital conversion terminal is received from the microphone line of the interface unit and is biased using the microphone bias power supplied from the power supply.

2. The apparatus of claim 1, wherein the accessory comprises at least one of a 3-pole earphone, a 4-pole earphone, a TV-OUT cable, and a Text Telephone (TTY) service cable.

3. The apparatus of claim 2, wherein the controller recognizes that the 3-pole earphone is mounted in the interface unit when the output current of the power supply exceeds the preset reference current.

4. The apparatus of claim 2, wherein the controller recognizes that one of the 4-pole earphone, the TV-OUT cable, and the TTY service cable is mounted in the interface unit when the output current of the power supply does not exceed the preset reference current.

5. The apparatus of claim 1, further comprising a display unit configured to display an icon indicating the recognized type of the accessory.

6. The apparatus of claim 1, wherein the voltage input to the analog-digital conversion terminal is the microphone bias power divided by a bias resistance between the power supply and the interface unit and an impedance of the accessory.

7. The apparatus of claim 1, further comprising a memory configured to store the reference current.

8. The apparatus of claim 7, wherein the memory stores an accessory recognition table for recognizing the type of the accessory based on the voltage input to the analog-digital conversion terminal.

9. A method for recognizing an accessory of a portable terminal, the method comprising:
    detecting an output current of a power supply supplying a microphone bias power for recognizing the accessory when connection of the accessory to an interface unit including a microphone line is sensed;
    comparing the output current of the power supply with a preset reference current;
    recognizing a type of an accessory corresponding to the output current of the power supply when the detected output current of the power supply exceeds the reference current; and
    recognizing a type of an accessory corresponding to a voltage input to an analog-digital conversion terminal of a controller when the output current of the power supply does not exceed the reference current,
    wherein the voltage input to the analog-digital conversion terminal is received from the microphone line of the interface unit and is biased using the microphone bias power supplied from the power supply.

10. The method of claim 9, wherein the recognizing of the type of the accessory comprises recognizing that a 3-pole earphone is connected to the interface unit when the detected output current exceeds the reference current.

11. The method of claim 9, further comprising outputting an icon indicating a recognized type of an accessory corresponding to the voltage input to the analog-digital conversion terminal or the output current of the power supply on a display unit.

12. The method of claim 9, wherein the recognizing of the type of the accessory according to the determined voltage comprises accessing an accessory recognition table.

13. The method of claim 9, wherein the determining of the voltage input to the analog-digital conversion terminal comprises determining the microphone bias power divided by a bias resistance between the power supply and an interface unit and an impedance of the accessory.

14. The method of claim 9, wherein the accessory comprises at least one of a 3-pole earphone, a 4-pole earphone, a TV-OUT cable, and a Text Telephone (TTY) service cable.

15. The method of claim 9, wherein the recognizing of the type of the accessory corresponding to the output current of the power supply comprises accessing a reference current table.

* * * * *